Patented Nov. 1, 1949

2,486,971

UNITED STATES PATENT OFFICE 2,486,971

LACQUER FOR POLYSTYRENE

Edward O. Ohlmann, Ann Arbor, Mich., assignor to The Dow Chemical Company, Midland, Mich., a corporation of Michigan No Drawing. Application August 8, 1946, Serial No. 689,184

5 Claims. (Cl. 260—13)

This invention concerns a composition for coating surfaces of polystyrene and related resins and a method of applying it.

In the manufacture of molded polystyrene objects, it is sometimes desirable to lacquer the surface to produce a pleasing color effect or to bring out the outline of printing or a design molded into the object. Unfortunately, known coating compositions for the most part adhere very poorly or spottily to polystyrene and frequently cause crazing of the molded surface.

The principal object of the present invention, therefore, is to provide a coating composition which will adhere firmly to the surface of articles molded of polystyrene and like resins and will not cause crazing. Another object is to provide a pretreatment for molded polystyrene surfaces which will improve the adherence of lacquer films.

These objects are realized according to the invention, by a coating composition in which the essential film-forming ingredients are a lower alkyl cellulose ether and a cycloalkanone-aldehyde condensation resin. These ingredients, together with plasticizers, colors, and pigments, as desired, are made up to spraying or brushing viscosity in a solvent therefor which is a non-solvent for polystyrene, e. g. in an alcohol or alcohol-glycol ether mixture. The presence of the cycloalkanone-aldehyde resin insures good adhesion to polystyrene surfaces while the proper choice of the lacquer solvent prevents crazing.

In so far as known, any lower alkyl ether of cellulose may be used in the new coating compositions, with ethyl cellulose being most suitable. In general, a standard ethoxy ethyl cellulose, i. e. one having an ethoxy content of 48.5 to 49.5 per cent, is preferred, particularly one having an intrinsic viscosity corresponding to an absolute viscosity of from 7 to 15 centipoises when dissolved in a concentration of 5 per cent by weight in a toluene-ethanol mixture containing 80 per cent by weight of toluene.

The other essential film-forming constituent of lacquers according to the invention is a cycloalkanone-aldehyde resin. As is known, such resins are prepared by heating together a cycloalkanone, usually cyclohexanone, and an aldehyde, preferably formaldehyde, in the presence of a condensing agent, such as an alkali. Resins formed by condensation of roughly equimolecular proportions of cyclohexanone and formaldehyde are preferred. Details of the manufacture of these products are given in German Patents 339,107 and 403,646.

The solvents used in the new coating compositions should be volatile liquids which exhibit good solvent power toward the cellulose ether and cycloalkanone-aldehyde resin ingredients, but which are non-solvents for polystyrene and other polyvinyl aromatic resins. In general, the lower aliphatic alcohols, alone or in admixture with the lower alkyl ethers of the lower glycols and glycol ethers, are most suitable.

In formulating the new compositions, the two essential film-forming constituents should preferably be present in roughly equal proportions, with plasticizers, e. g. tri-aryl phosphates, and colors or pigments being added as required. A preferred lacquer would include, as the film-forming constituents, at least 30 per cent by weight of a standard ethoxy ethyl cellulose and at least 30 per cent of a cyclohexanone-formaldehyde resin with not over 40 per cent of a compatible plasticizer, all made up to suitable viscosity in an alcoholic solvent.

The compositions just described exhibit excellent adhesion to surfaces of molded polystyrene or other polymerized vinyl aromatic resins, e. g. polymethylstyrene, polychlorostyrene, and polyvinylnaphthalene. In use, the compositions are simply brushed or sprayed onto the surface to be coated, after which the solvent is allowed to evaporate.

Improved adherence of the coating compositions to polystyrene and related resins may be obtained by spraying the resin, before coating, with a volatile halo-aliphatic hydrocarbon, such as carbon tetrachloride, chloroform, methylene chloride, ethyl bromide, ethylene dibromide, or mixtures thereof. Spraying is best carried out at a rate sufficiently slow that the sprayed surface never appears wet, i. e. so that droplets of the liquid never stand on the surface. This treatment etches the polystyrene very slightly, providing a surface to which coating compositions adhere tenaciously.

The following example will illustrate the invention, but is not to be construed as limiting its scope.

Example

A cyclohexanone-formaldehyde resin was prepared by first mixing 25 volumes of cyclohexanone with 3 volumes of 50 per cent aqueous sodium hydroxide and heating the mixture to 80° C. Heating was then discontinued; 25 volumes of 40 per cent aqueous formaldehyde was added, and the mixture was stirred until it became very viscous. The resulting viscous material was then washed thoroughly with water several times to remove sodium hydroxide, and the washed resinous mass was finally heated slowly to a temperature of 125° C. A hard, transparent resin was thus produced.

A lacquer was then made up by stirring 6 parts by weight of this resin, 5 parts of a standard ethoxy ethyl cellulose (10 centipoise viscosity), 2.5 parts of diphenyl mono-ortho-xenyl phosphate as plasticizer, and 2.4 parts of a finely divided pigment into a mixture of 6 parts by volume of ethanol and 4 parts of ethoxy ethanol. The proportion of solvent was chosen so that the lacquer contained about 27 per cent solids.

A molded polystyrene object was then pretreated by spraying with a mixture of 3 volumes of ethyl bromide and 5 volumes of chloroform at a slow rate. The lacquer described was then sprayed on the polystyrene and allowed to dry. After drying the film adhered so tightly it could not be removed except by destroying the object.

What is claimed is:

1. As an article of manufacture, a molded polystyrene object having adhering to the surface thereof a film of a coating composition consisting essentially of ethyl cellulose and a binary cyclohexanone-formaldehyde condensation resin.

2. A coating composition, particularly adapted to coating surfaces of molded polystyrene, comprising from 30 to 70 per cent by weight of ethyl cellulose and from 30 to 70 per cent by weight of a binary cyclohexanone-formaldehyde condensation resin as the essential film-forming ingredients dissolved in an alcoholic solvent therefor which is a non-solvent for polystyrene.

3. A coating composition, particularly adapted to coating surfaces of molded polystyrene, comprising, as the film-forming constituents, from 30 to 70 percent by weight of ethyl cellulose having an ethoxy content of 48.5 to 49.5 percent, from 30 to 70 percent of a binary cyclohexanone-formaldehyde condensation resin, and not over 40 percent of a compatible plasticizer, dissolved in an exclusively alcoholic solvent therefor which is a non-solvent for polystyrene.

4. A coating composition, particularly adapted to coating surfaces of molded polystyrene, consisting essentially of 5 parts by weight of ethyl cellulose having an ethoxy content of 48.5 to 49.5 percent, 6 parts of binary cyclohexanone-formaldehyde resin, 2.5 parts of a tri-aryl phosphate plasticizer, and 2.4 parts of a finely-divided pigment dissolved in a mixture of 6 parts by volume of ethanol and 4 parts of ethoxy ethanol.

5. As an article of manufacture, a polymerized vinyl aromatic resin having adhering to the surface thereof a film of a coating composition essentially comprising ethyl cellulose and a binary cyclohexanone-formaldehyde condensation resin.

EDWARD O. OHLMANN.

REFERENCES CITED

The following references are of record in the file of this patent:

UNITED STATES PATENTS

| Number | Name | Date |
| --- | --- | --- |
| 1,963,142 | Moss et al. | June 19, 1934 |
| 2,059,943 | Graves | Nov. 3, 1936 |
| 2,074,786 | Graves | Mar. 23, 1937 |
| 2,312,296 | Hempel | Feb. 23, 1943 |
| 2,363,829 | Caplan et al. | Nov. 28, 1944 |

Certificate of Correction

Patent No. 2,486,971　　　　　　　　　　　　　　　　November 1, 1949

EDWARD O. OHLMANN

It is hereby certified that errors appear in the above numbered patent requiring correction as follows:

In the grant, line 3, and in the heading to the printed specification, line 5, State of incorporation, for "Michigan" read *Deluware*; and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*